Jan. 30, 1968  L. JORI  3,366,458
APPARATUS FOR DILUTING AN ACETIC ACID SOLUTION OF
CELLULOSE ACETATE WITH WATER
Original Filed June 3, 1963
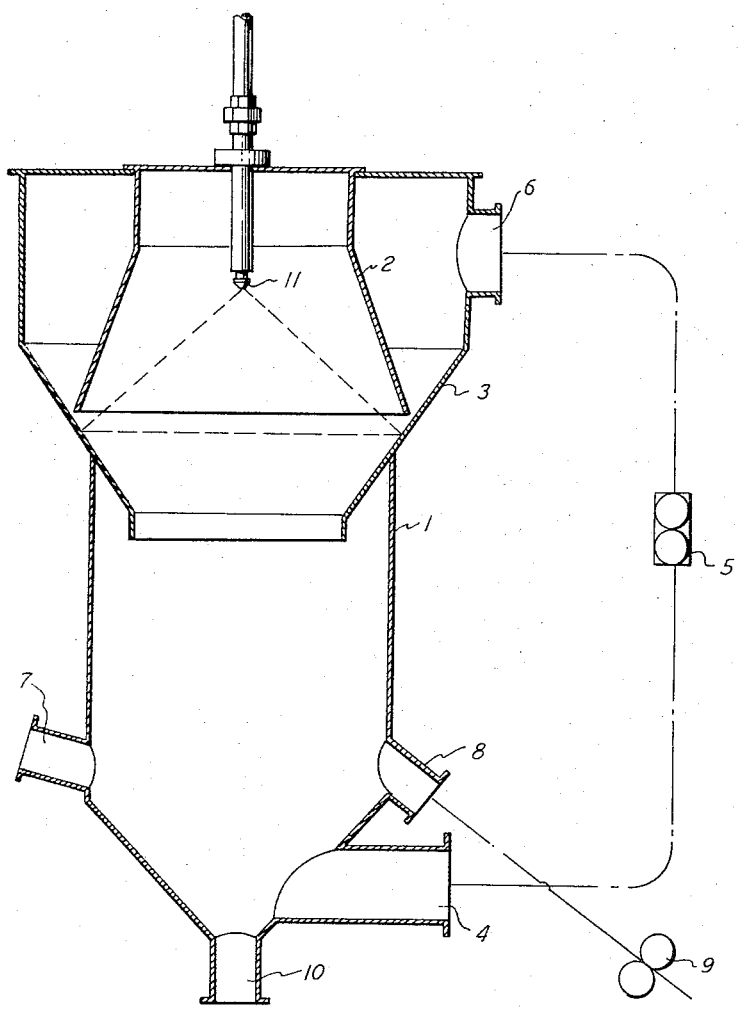
INVENTOR
LUCIANO JORI
BY Wenderoth, Lind & Ponack
ATTORNEYS United States Patent Office 3,366,458
Patented Jan. 30, 1968

3,366,458
APPARATUS FOR DILUTING AN ACETIC ACID SOLUTION OF CELLULOSE ACETATE WITH WATER
Luciano Jori, 4 Via Freguglia, Milan, Italy
Original application June 3, 1963, Ser. No. 285,092, now Patent No. 3,332,937, dated July 25, 1967. Divided and this application Jan. 18, 1967, Ser. No. 610,179
Claims priority, application Italy, June 22, 1962, 12,505/62
1 Claim. (Cl. 23—267)

ABSTRACT OF THE DISCLOSURE

The invention relates to an apparatus which is useful in achieving the water dilution of an acetic acid solution of cellulose acetate with a water solution of acetic acid. The apparatus comprises an inclined wall along which flows the acetic acid solution of cellulose acetate which is to be diluted. An atomizer is present through which an aqueous solution of acetic acid is introduced into the apparatus. The atomized aqueous solution of acetic acid contacts the acetic acid solution of cellulose acetate as it flows along the inclined wall and dilutes the same. The apparatus contains means for introducing the solution to be diluted into the apparatus, means for removing the diluted solution and means for recirculating the acetic acid solution of cellulose acetate.

This application is a division of U.S. patent application Ser. No. 285,092, filed June 3, 1963, now Patent 3,332,937.

The object of the present invention is to provide an apparatus for diluting an acetic acid solution of cellulose acetate with water.

As in the case of other batch processes, also in the production of cellulose acetate it has been attempted to transform the batch process into a continuous process. One of the biggest difficulties to be overcome, however, is that encountered at the moment of the precipitation of the cellulose acetate from its acetic acid solution.

It is known that the acetylation process consists of an esterification of the cellulose, said esterification being effected after a preliminary treatment, by acetic anhydride in the presence of acetic acid as solvent, said acetylation occurring in homogeneous phase and in the presence of a catalyst, normally sulphuric acid. Under these conditions, the cellulose triacetate forms which, however, does not serve the purpose for certain applications. Thus, for instance, this compound is useless for the production of textile fibers from acetonic solutions, and is useless generally for the preparation of solutions in acetone, and is also useless for certain uses as plastic material. For these uses, the acetylation degree is too high, and must be reduced until obtaining a product having an acetyl number about 54. This will be obtained by submitting the triacetate, even in acetic acid solution, to an hydrolysis, or to a saponification. After this operation has been carried out up to the desired limit, the cellulose acetate will be precipitated from its acetic solution and this is done by pouring the acetic acid solution itself into water.

This operation shows certain difficulties also in the batch process; these difficulties are remarkably increased when the batch process is to be transformed into a continuous process. The precipitated cellulose acetate is submitted to a thorough washing in order to remove all the acetic acid contained therein. However, often in the precipitation crumbs of product will be formed, having a horny aspect which cannot be well washed. In the batch process, in these instances, the duration of washing is extended, but in the continuous process, of course, this is not possible, as the durations to time are tied to the other operations.

It is known that the precipitation of the cellulose acetate from its acetic acid solution is rendered easier, even effecting said precipitation by pouring it into water, if before this operation a certain amount of water is added to the acetic acid solution, preferably in the form of a diluted acetic acid solution, so as to bring the solubility of the cellulose acetate to its limit, however avoiding a precipitation thereof even in minimum amounts. By effecting the precipitation of the acetate from a solution to which water has been added as aforedescribed, regular grains of cellulose acetate will be obtained, free from particles having a horny aspect, and also free from unduly small particles, having a powder aspect, also said particles being difficultly washable.

It will be suitable to add the water to the acetic acid solution of cellulose acetate, under the form of a low concentration acetic acid water solution. Thus for instance for an acetic acid solution of a cellulose acetate soluble in acetone, having an acetyl number about 54.5 and a Baumé viscosity about 45, it will be convenient to use an 8–10% acetic acid water solution.

From a 12% cellulose acetate solution it will be possible, when operating under given conditions, to reduce the acetic acid contents to 53–54%.

This dilution can be effected, however, under particular conditions without incurring the formation of acetate crumbs or separation of acetate powder which, as aforesaid, hinder a good washing of the cellulose acetate after its precipitation.

It has now been found, and this is the object of the present invention, that this dilution can be effected in the best way by using the apparatus as described later on, wherein the cellulose acetate acetic acid solution flows in a relatively thin layer along an inclined and preferably frustoconical wall. While the cellulose acetate solution moves along this wall, said solution will contact the acetic acid diluted solution which will have been previously atomized. This occurs within a reservoir, into which enters continuously the cellulose acetate solution to be diluted and the diluted acetic acid solution, and wherefrom also continuously outflows the diluted cellulose acetate solution. The cellulose acetate solution preferably circulates in endless circuit with a speed remarkably higher than the feeding rate.

The layer of the cellulose acetate acetic acid solution flowing on the frustoconical wall will be 5–15 millimeters thick, preferably 8–10 millimeters thick.

For a better knowledge, the process and the apparatus will be hereinafter described with reference to the attached drawing.

In the drawing, the reference numeral 1 denotes a tank having a greater diameter at its top portion, and tapered downwards so as to originate the frustoconical wall 3. Inside the tank, a second frustoconical wall 2 is provided, the lower portion of which is close to the wall 3 so as to create a circular slot a few millimeters wide, so that the cellulose acetate solution entering into the top portion of the tank 1 through the inlet 6 is carried to flow on the wall 3, under the wall 2 in a thin layer. Through the atomizer 11 acetic acid diluted solution enters into the tank. The atomized diluted acetic acid solution strikes the cellulose acetate solution while the latter flows downwards along the wall 3. This solution collects in the bottom portion of the tank 1, wherefrom it will be extracted through the coupling tube 4 by means of the pump 5 carrying the solution into the tank 1 through the inlet 6. Into the tank 1 is continuously fed the cellulose acetate solution to be diluted through the inlet 7, and through the outlet 8 and by means of the pump 9, the corresponding amount of diluted solution is continuously removed. At the bottom of the apparatus there is provided an opening 10 for cleaning.

Within the tank 1 is always maintained a liquid level above the two fittings 7 and 8 and said level is ensured by the level of a feeding tank (not shown in the figure) wherefrom tank 1 is fed through the fitting 7.

Hereinafter by way of non-limitative example, a practical embodiment of this invention will be described.

EXAMPLE

The dilution apparatus as above described is fed, with 4,000 kilograms per hour of an acetic acid solution of cellulose acetate containing 12% cellulose acetate and 65.4% acetic acid, the balance being water and impurities coming from the cellulose acetylation process. The cellulose acetate has an acetyl number 54, and a Baumé viscosity 44. Through the atomizer, 1,080 kilograms per hour of water solution of 8% acetic acid are introduced into the same apparatus. The solution of cellulose acetate is recycled into the dilution apparatus at a rate of 120 cubic meters per hour. From the apparatus are extracted 5,080 kilograms per hour of perfectly limpid diluted solution of acetate of cellulose, containing 9.45% of cellulose acetate and 53.20% acetic acid.

When this solution is poured into water, by the technical known means, an easily washable product is obtained, free from horny crumbs and powder.

The present invention has been described in one preferred embodiment, it being however, understood that variations might be practically adopted without departing from the scope of the present invention.

Having thus disclosed the invention, what is claimed is:

1. An apparatus useful in achieving the water dilution of an acetic acid solution of cellulose acetate with a water solution of acetic acid which apparatus comprises:

(1) a substantially cylindrical tank having a top portion of greater diameter than the lower portion, said tip and lower portions being interconnected by a first frustoconical surface;

(2) means for atomizing an aqueous solution of acetic acid and directing said atomized solution into contact with the said frustoconical surface;

(3) a second frustoconical surface tapering upwardly within the first frustoconical surface and encircling the atomizing means, the lower extremity of the second conical surface being spaced from the first conical surface by a few millimeters;

(4) means for introducing the acetic acid solution of cellulose acetate into the said top portion of the tank;

(5) outlet means in the lower portion of said tank for withdrawing the diluted solution; and (6) means for recirculating the acetic acid solutions of cellulose acetate, and comprising an outlet in the lower portion of the tank from which the solution is withdrawn and pumping means for delivering the withdrawn solution to the inlet means above the frustoconical surface.

References Cited

UNITED STATES PATENTS

| | | | |
|---|---|---|---|
| 2,575,119 | 11/1951 | Peebles | 159—4 |
| 2,640,761 | 6/1953 | Wiseman | 159—13 |
| 2,969,347 | 1/1961 | Bellinger | 159—16 |
| 2,974,131 | 3/1961 | McLeod | 23—275 X |

NORMAN YUDKOFF, *Primary Examiner.*

WILBUR L. BASCOMB, JR., *Examiner.*

S. EMERY, *Assistant Examiner.*